United States Patent
Hoskinson et al.

(10) Patent No.: US 11,295,225 B2
(45) Date of Patent: Apr. 5, 2022

(54) SUPERCONDUCTING QUANTUM PROCESSOR AND METHOD OF OPERATING SAME

(71) Applicant: D-Wave Systems Inc., Burnaby (CA)

(72) Inventors: Emile M. Hoskinson, Vancouver (CA); Trevor Michael Lanting, Vancouver (CA)

(73) Assignee: D-WAVE SYSTEMS INC., Burnaby (CA)

(*) Notice: Subject to any disclaimer, the term of this patent is extended or adjusted under 35 U.S.C. 154(b) by 680 days.

(21) Appl. No.: 16/029,026

(22) Filed: Jul. 6, 2018

(65) Prior Publication Data

US 2019/0019099 A1  Jan. 17, 2019

Related U.S. Application Data

(60) Provisional application No. 62/530,052, filed on Jul. 7, 2017, provisional application No. 62/534,117, filed on Jul. 18, 2017.

(51) Int. Cl.
*G06N 10/00* (2019.01)
*G06F 15/78* (2006.01)

(52) U.S. Cl.
CPC ............ *G06N 10/00* (2019.01); *G06F 15/78* (2013.01)

(58) Field of Classification Search
CPC .................................. G06N 10/00; G06F 15/78
See application file for complete search history.

(56) References Cited

U.S. PATENT DOCUMENTS

| | | | | |
|---|---|---|---|---|
| 2005/0059138 A1* | 3/2005 | Vitaliano | ............... | B82Y 10/00 435/287.2 |
| 2015/0009746 A1* | 1/2015 | Kucsko | .................. | G06N 10/00 365/152 |
| 2015/0324705 A1* | 11/2015 | Biercuk | ................ | G06F 3/0673 711/101 |
| 2016/0071021 A1* | 3/2016 | Raymond | .............. | G06N 10/00 712/28 |

FOREIGN PATENT DOCUMENTS

WO    WO-2013082382 A1 *  6/2013  ......... G01R 33/4616

OTHER PUBLICATIONS

S. Yu and Z. Xi, "The dynamics of a hybrid system based on the NV center in spin bath," 2015 34th Chinese Control Conference (CCC), 2015, pp. 8357-8361, doi: 10.1109/ChiCC.2015.7260967. (Year: 2015).*

(Continued)

*Primary Examiner* — Ajay Ojha
(74) *Attorney, Agent, or Firm* — Cozen O'Connor

(57) ABSTRACT

Passive and actives approaches to mitigating the effects of spin-bath polarization are described and illustrated. Such may, for example, include at least partially depolarizing the spin-bath polarization, for instance by: performing an annealing cycle by the quantum processor to generate a final state of a qubit of the quantum processor; flipping the final state of the qubit of the quantum processor to an opposite state; and latching the qubit in the opposite state for a predetermined duration.

30 Claims, 8 Drawing Sheets

(56) References Cited

OTHER PUBLICATIONS

P. I. Bunyk et al., "Architectural Considerations in the Design of a Superconducting Quantum Annealing Processor," in IEEE Transactions on Applied Superconductivity, vol. 24, No. 4, pp. 1-10, Aug. 2014, Art No. 1700110, doi: 10.1109/TASC.2014.2318294. (Year: 2014).*
Hendrik Bluhm et al., "Enhancing the Coherence of a Spin Qubit by Operating it as a Feedback Loop That Controls its Nuclear Spin Bath", Physical Review Letters, Nov. 19, 2010 (Year: 2010).*
Kumar, P. et al., "Origin and Suppression of 1/f Magnetic Flux Noise," arXiv:1604.00877v1 [cond-mat.supr-con] Apr. 4, 2016, 13 pages.
Sendelbach, S. et al., "Magnetism in SQUIDs at Millikelvin Temperatures," arXiv:0802.1518v1 [cond-mat.supr-con] Feb. 11, 2008, 4 pages.

* cited by examiner

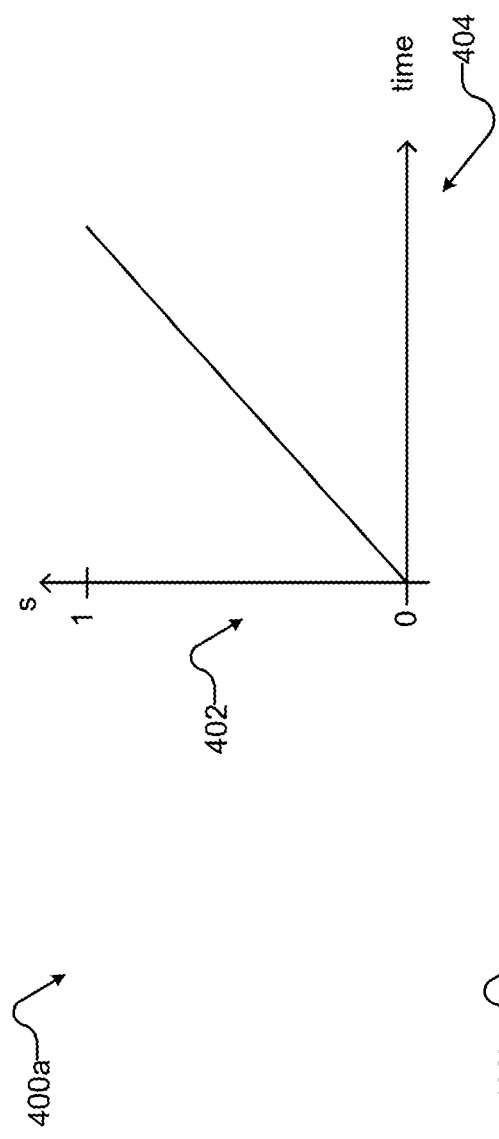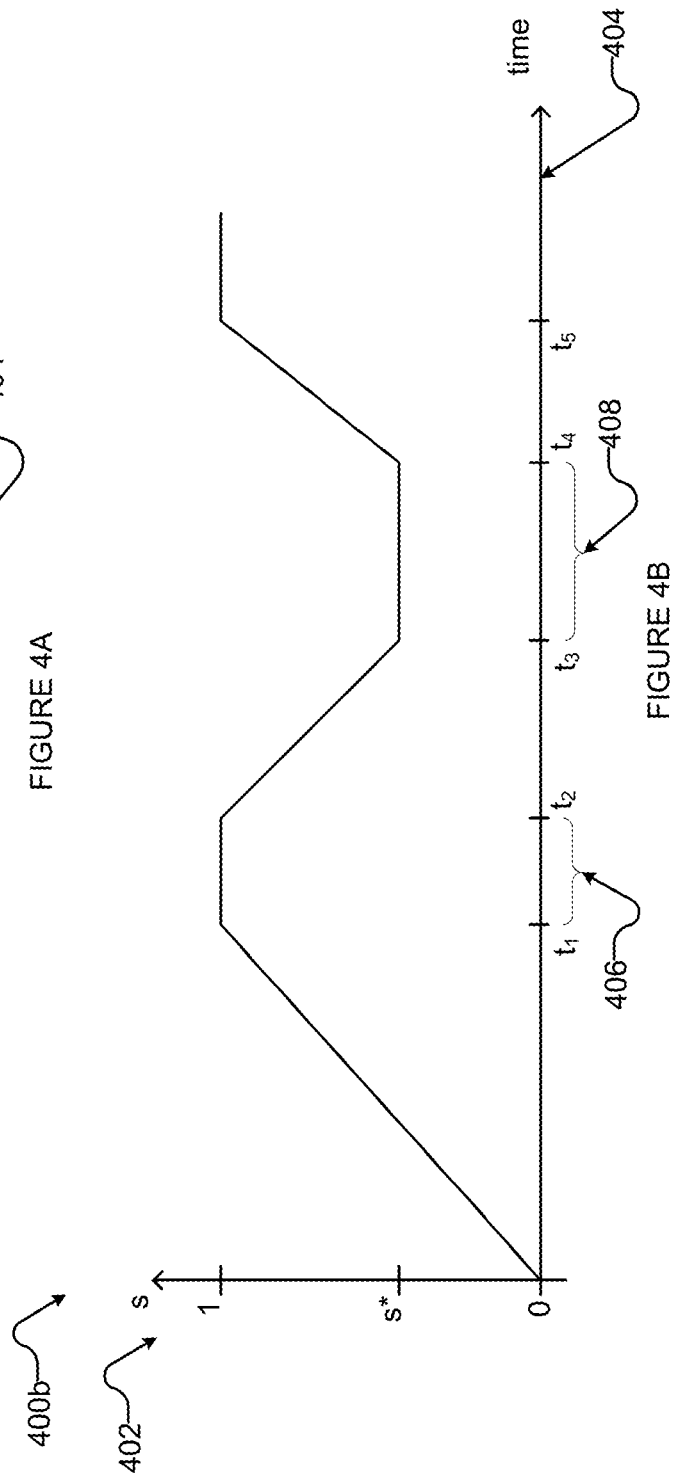
FIGURE 4A
FIGURE 4B

SUPERCONDUCTING QUANTUM PROCESSOR AND METHOD OF OPERATING SAME

BACKGROUND

Field

This disclosure generally relates to systems, devices, methods, and articles for quantum computation, and, in particular, for improving the performance and efficiency of quantum annealing.

Quantum Devices

Quantum devices are structures in which quantum mechanical effects are observable. Quantum devices include circuits in which current transport is dominated by quantum mechanical effects. Such devices include spintronics, where electronic spin is used as a resource, and superconducting circuits. Both spin and superconductivity are quantum mechanical phenomena. Quantum devices can be used for measurement instruments, in computing machinery, and the like.

Quantum Computation

Quantum computation and quantum information processing are active areas of research and define classes of vendible products. A quantum computer is a system that makes direct use of at least one quantum-mechanical phenomenon, such as, superposition, tunneling, and entanglement, to perform operations on data. The elements of a quantum computer are quantum binary digits, known as qubits. Quantum computers hold the promise of providing exponential speedup for certain classes of computational problems such as computational problems simulating quantum physics. Useful speedup may exist for other classes of problems.

One model of quantum computing is adiabatic quantum computing. Adiabatic quantum computing can be suitable for solving hard optimization problems, for example. Further details on adiabatic quantum computing systems, methods, and apparatus are described, for example, in U.S. Pat. No. 7,135,701 entitled "ADIABATIC QUANTUM COMPUTATION WITH SUPERCONDUCTING QUBITS"; and U.S. Pat. No. 7,418,283 "ADIABATIC QUANTUM COMPUTATION WITH SUPERCONDUCTING QUBITS".

Quantum Annealing

Quantum annealing is a computational method that may be used to find a low-energy state of a system, typically preferably the ground state of the system. Similar in concept to classical simulated annealing, the method relies on the underlying principle that natural systems tend towards lower energy states because lower energy states are more stable. While classical annealing uses classical thermal fluctuations to guide a system to a low-energy state, quantum annealing may use quantum effects, such as quantum tunneling, as a source of delocalization to reach an energy minimum more accurately and/or more quickly than classical annealing. In quantum annealing, thermal effects and other noise may be present. The final low-energy state may not be the global energy minimum.

Adiabatic quantum computation may be considered a special case of quantum annealing. In adiabatic quantum computation, the system ideally begins and remains in its ground state throughout an adiabatic evolution. Thus, those of skill in the art will appreciate that quantum annealing systems and methods may generally be implemented on an adiabatic quantum computer. Throughout this specification and the appended claims, any reference to quantum annealing is intended to encompass adiabatic quantum computation unless the context requires otherwise.

Quantum annealing uses quantum mechanics as a source of delocalization, sometimes called disorder, during the annealing process.

The foregoing examples of the related art, and limitations related thereto, are intended to be illustrative and not exclusive. Other limitations of the related art will become apparent to those of skill in the art upon a reading of the specification and a study of the drawings.

BRIEF SUMMARY

Methods and systems to passively and/or actively mitigate the effects of spin-bath polarization are described and illustrated.

Passive mitigation can be realized by, for example a) reducing the time for which the quantum processor stores state information in the body of each qubit; b) copying the state of the QFP into the next shift register stage to eliminate or at least reduce a contribution to spin-bath polarization caused by galvanic coupling of each qubit and the respective QFP; c) modifying the read-out protocol to eliminate or at least reduce a qubit- or QFP-sourced spin-bath polarization by storing qubit state information in the QFP; d) introducing a sufficient delay between one annealing cycle and the next annealing cycle to allow the spin-bath polarization to decay i.e., allow enough time for spin-bath depolarization; e) adding a passive delay between anneals that is equal to the schedule duration for anneal schedules that differ from a standard forward anneal pattern; f) modifying a duty cycle and programming protocols to minimize, or at least reduce, on-chip heating, and, in particular, to minimize, or at least reduce, fluctuations in temperature; g) employing a fabrication process that reduces the spin bath polarization signal; h) raising the temperature to reduce the degree of spin-bath polarization; i) replace galvanic coupling of one or more of the qubits to their respective QFPs by non-galvanic coupling; and/or j) replace at least some of the wiring used for inductance by one or more Josephson junctions.

Active mitigation can be realized by, for example: 1) performing an annealing cycle, 2) while the qubit barrier is high (i.e., beyond the freeze-out point), reading out each qubit by shifting the final state of each qubit to a QFP, such that the spin orientation of the QFP reflects the spin orientation of the respective qubit; 3) setting the compound Josephson junction (CJJ) bias of a buffer QFP between a qubit and its respective QFP to zero to cause the buffer QFP to behave as an antiferromagnetic (AFM) coupler, and keeping the QFP latched, and with the buffer QFP behaving as an AFM coupler, persistent current in the QFP can generate a flux bias in the qubit via the buffer QFP; 4) raising the qubit barrier, and, in so doing, cause the qubit state (spin orientation) to be the opposite of the QFP, and the opposite of its final state after the annealing cycle; 5) keeping the qubit latched for a sufficiently long time to eliminate, or at least reduce, the spin-bath polarization; 6) lower the qubit barrier, and/or 7) reading out the final qubit state after the annealing cycle from the QFP. In some implementations, each of the qubit CJJ bias lines are operated separately, and in sequence, to at least reduce the likelihood of swamping the bias from the QFP with a bias from one or more neighboring qubits.

A method of operation of a hybrid computing system comprising a quantum processor may be summarized as including: performing a first quantum annealing cycle by the quantum processor; and actively mitigating by the quantum processor a spin-bath polarization.

The quantum processor may include a plurality of superconducting qubits, and performing a first quantum annealing cycle by the quantum processor may include performing a first quantum annealing cycle by the quantum processor to generate a first state of a qubit of the plurality of superconducting qubits.

The method of operation of a hybrid computing system comprising a quantum processor may further include reading out the first state of the qubit.

The method of operation of a hybrid computing system comprising a quantum processor may further include performing a second quantum annealing cycle by the quantum processor after actively mitigating by the quantum processor the spin-bath polarization.

Performing a second quantum annealing cycle by the quantum processor after actively mitigating by the quantum processor the spin-bath polarization may include performing a second quantum annealing cycle by the quantum processor after ceasing actively mitigating by the quantum processor the spin-bath polarization. Reading out the first state of the qubit may include: raising a tunneling barrier of the qubit; and shifting the first state of the qubit to a quantum flux parametron (QFP). Shifting the first state of the qubit to a QFP may include causing the spin orientation of the QFP to be the same as the spin orientation of the qubit.

The method of operation of a hybrid computing system comprising a quantum processor may further include: causing a buffer QFP to behave as an antiferromagnetic (AFM) coupler, the buffer QFP providing AFM coupling between the qubit and the QFP; raising the tunneling barrier of the qubit; and lowering the tunneling barrier of the qubit after a determined duration.

Causing a buffer QFP to behave as an antiferromagnetic (AFM) coupler may include setting a compound Josephson junction (CJJ) bias of a buffer QFP to zero. Actively mitigating a spin-bath polarization may include at least partially depolarizing by the quantum processor the spin-bath polarization. At least partially depolarizing the spin-bath polarization may include: flipping the first state of the qubit of the quantum processor to a second state; and latching the qubit in the second state for a determined duration. Flipping the first state of the qubit of the quantum processor to a second state may include flipping the first state of the qubit of the quantum processor to a second state opposite the first state. Flipping the first state of the qubit of the quantum processor to a second state opposite the first state may include: reading out the first state of the qubit; and causing the state of the qubit to be the opposite state of the first state. Performing an annealing cycle by the quantum processor to generate a first state of a qubit of the quantum processor may include performing an annealing cycle by the quantum processor to generate a first spin orientation of a qubit of the quantum processor. Flipping the first state of the qubit of the quantum processor to a second state may include flipping the first state of the qubit of the quantum processor to a second spin orientation, the second spin orientation opposite to the first spin orientation.

A hybrid computing system may be summarized as including: a quantum processor, and a control system including circuitry communicatively coupled to control and to readout from the quantum processor, the control system which in response to executable control logic performs any of the above methods.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been selected for ease of recognition in the drawings.

FIGS. 4A, 4B and 4C are timing diagrams that illustrate an annealing schedule for a quantum processor, in accordance with the present systems, devices, articles, and methods.

DETAILED DESCRIPTION

Figure 1:
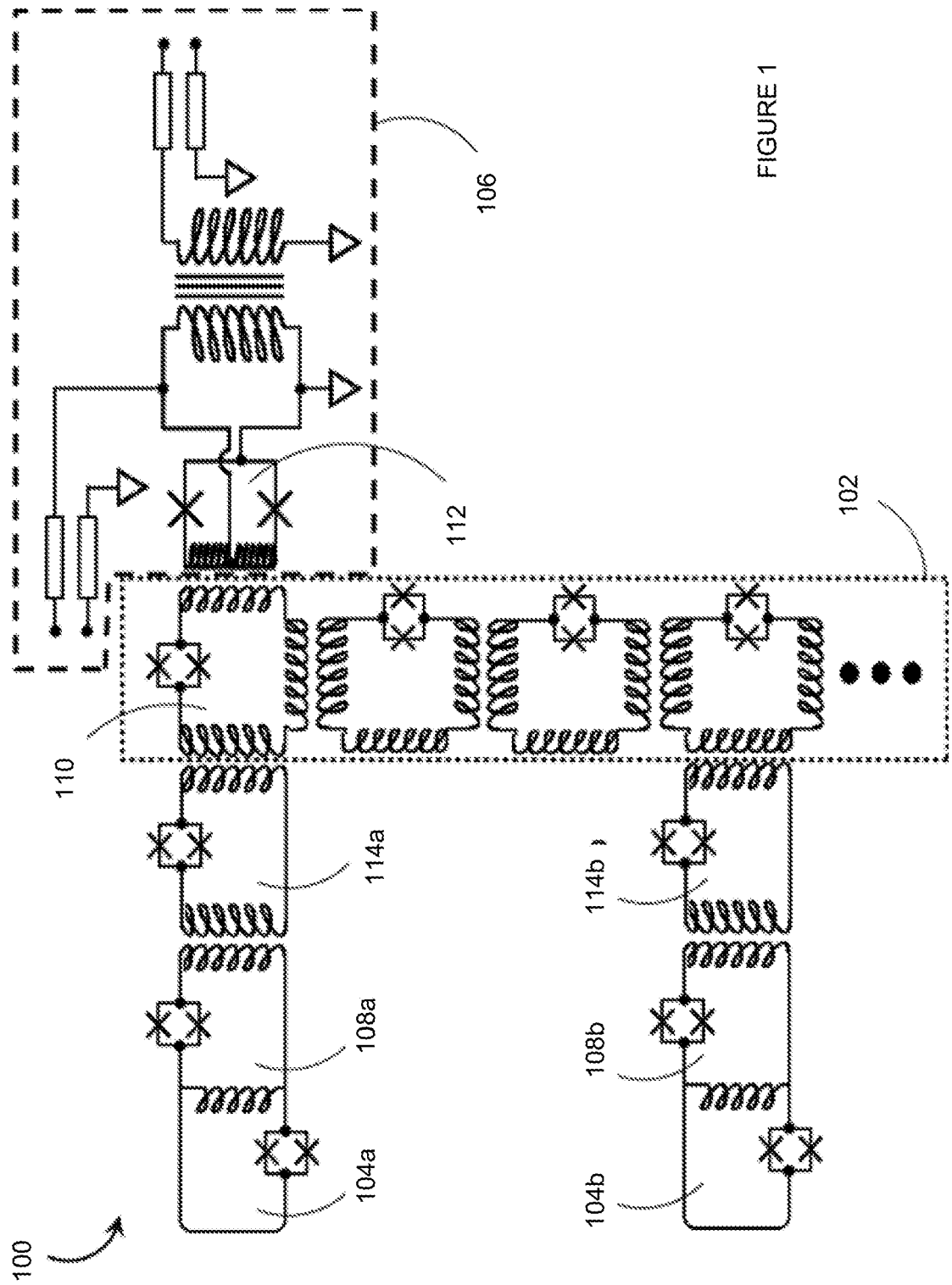
FIG. 1 is a schematic diagram that illustrates a portion of an exemplary quantum processor, in accordance with the present systems, devices, articles, and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, couplers, and control systems including microprocessors and drive circuitry have not been shown or described in detail to avoid unnecessarily obscuring descriptions of the embodiments of the present methods. Throughout this specification and the appended claims, the words "element" and "elements" are used to encompass, but are not limited to, all such structures, systems, and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" "an embodiment", "another embodiment", "one example", "an example", "another example", "one implementation", "another implementation", or the like means that a particular referent feature, structure, or characteristic described in connection with the embodiment, example, or implementation is included in at least one embodiment, example, or implementation. Thus, the appearances of the phrases "in one embodiment", "in an embodiment", "another embodiment" or the like in various places throughout this specification are not necessarily all referring to the same embodiment, example, or implementation. Furthermore, the particular features, structures, or characteristics may be combined in any suitable manner in one or more embodiments, examples, or implementations.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors. It should also be noted that the term "or" is generally employed in its sense including "and/or" unless the content clearly dictates otherwise.

The headings provided herein are for convenience only and do not interpret the scope or meaning of the embodiments.

See below for a description of an example hybrid computing system and an example superconducting quantum processor with reference to FIGS. 6 and 7.

Spin-Bath Polarization

A superconducting quantum processor can include a superconducting integrated circuit, the superconducting integrated circuit including one or more superconducting devices such as superconducting qubits, coupling devices, digital-to-analog converters (DACs) and the like. The superconducting integrated circuit can also include superconducting wiring. The superconducting wiring can include one or more wiring layers. The wiring layers can be deposited and patterned during fabrication of the superconducting integrated circuit to form one or more superconducting wires. The superconducting wiring can include a superconducting metal, for example niobium or aluminum.

The superconducting integrated circuit can include one or more superconducting flux qubits, and the qubits can be subject to flux noise present in the quantum processor. One source of flux noise is 1/f noise. The power spectral density of 1/f noise is inversely proportional to its frequency. The 1/f noise can be caused, at least in part, by unpaired spins on the surfaces of superconductors in the superconducting integrated circuit. For example, an unintended by-product of the fabrication of a superconducting integrated circuit can a "bath" of magnetic spins (referred to in this application as a spin-bath) surrounding the superconducting wiring. The spins can be at a metal/oxide interface, on a surface of the metal, or in an insulating dielectric layer. The magnetic spins can fluctuate, and can cause 1/f flux noise.

Orientation of the magnetic spins can be influenced by a magnetic field generated by a current flowing in the superconducting wiring. Typically, the spins can at least partially align with the magnetic field, and become at least partially polarized. The magnitude of polarization can increase a) with the magnitude of the current flowing in the superconducting wire, and b) with the duration for which the current flows. The magnitude of polarization can scale inversely with temperature of the superconducting integrated circuit. A lower temperature can lead to more polarization, for example.

A magnetic field generated by the at least partially polarized spins can induce a flux bias in a nearby superconducting device such as a superconducting flux qubit. The flux bias can remain even after the current in the superconducting wire drops to zero. Typically, the bias decays exponentially, or at least in according to a decay function that can be approximated by an exponential function, with a time constant having an order of magnitude of hundreds of microseconds. In one implementation, for example, the bias due to spin-bath polarization can decay with a time constant of approximately 150 µs.

There is evidence for the effect of unpaired surface spins in superconducting devices. See, for example, "Magnetism in SQUIDs at Millikelvin Temperatures", S. Sendelbach et. al., PRL 100, 227006 (2008) which describes evidence for a high density of unpaired surface spins in a thin-film SQUID. Fluctuations of the unpaired surface spins can produce a measurable effect, and coherent magnetization of the spins can couple a flux of order of a magnetic flux quantum ($1\Phi_0$) to the SQUID.

In "Origin and Suppression of 1/f Magnetic Flux Noise", P. Kumar et. al., Phys. Rev. Applied 6, 041001 (2016), 1/f magnetic flux noise is attributed to unpaired magnetic defects on the surfaces of superconducting devices. It is suggested that adsorbed molecular $O_2$ is the dominant contributor, and it is shown that the magnetism can be suppressed by appropriate surface treatment or improvement in the sample vacuum environment.

The effect of the at least partially polarized spins (referred to as the spin-bath polarization effect in the present application) can adversely affect operation of a superconducting quantum processor.

The Effect of Spin-Bath Polarization on Quantum Annealing Performance

A superconducting quantum processor can be operated as a quantum annealer. Quantum annealing can include performing an annealing cycle. At the end of the annealing cycle, qubits in the superconducting quantum processor can be in a latched (also referred to in the present application as fixed) final state. When the qubits are in a latched final state, current can flow in the wiring of each qubit, the direction of the current corresponding to the respective final state of each qubit. The current flowing in the wiring of each qubit at the end of the annealing cycle can at least partially polarize the spin-bath described above. For example, when the qubit is in a "spin-up" latched final state, the current flows in a first direction in the qubit's wiring, creating a magnetic field and causing at least partial polarization of the spin-bath. When the qubit is in a "spin-down" latched final state, the current flows in the opposite direction, causing at least partial polarization of the spin-bath with opposite polarity.

The spin-bath polarization by the qubit can generate a qubit flux bias (offset). In one implementation, the qubit offset is approximately $5\mu\Phi_0$ after spin-bath polarization having a polarization time corresponding to a typical anneal cycle time of approximately 10 µs. The qubit offset decays to approximately $1\mu\Phi_0$ before the start of the next anneal cycle assuming a typical delay of approximately 150 µs between successive anneal cycles.

After the end of the annealing cycle, the final state of each qubit can be read out. In one implementation, the final state of each qubit can be read out by copying the state into a shift register comprising a series of quantum flux parametron (QFP) devices, each of these devices referred to in the present application as a QFP. In other implementations, other read out approaches are used. As described below, systems and methods for spin-bath depolarization described in the present application can implemented in a superconducting quantum processor using a suitable read out system. Also, as described below, systems and methods for spin-bath depolarization described in the present application can be implemented without reading out the final state of each qubit.

FIG. 1 is a schematic diagram that illustrates a readout system 100 of an exemplary superconducting quantum processor, in accordance with the present systems, devices, articles, and methods. Readout system 100 includes a superconducting shift register 102 operable to route flux signals from at least two superconducting flux qubits 104a and 104b to a readout circuit 106.

In some embodiments, the superconducting quantum processor can be configured to perform adiabatic quantum computation and/or quantum annealing. Readout system 100 includes a first superconducting flux qubit 104a and a second superconducting flux qubit 104b. In the illustrated embodiment, first superconducting flux qubit 104a is communicatively coupleable to a first QFP 108a (also referred to in the present application as a first latching qubit) via galvanic coupling, and second superconducting flux qubit 104b is communicatively coupleable to a second QFP 108b (also referred to in the present application as a second latching qubit) via galvanic coupling.

A person of skill in the art will appreciate that the communicative coupling between first superconducting flux qubit 104a and first latching qubit 108a, and/or the communicative coupling between second superconducting flux qubit 104b and second latching qubit 108b may be via an alternative form of coupling, such as inductive coupling.

Readout system 100 further includes a plurality of additional latching qubits configured and arranged to operate as a superconducting shift register 102 in accordance with the teachings of U.S. Pat. No. 7,843,209 entitled "ARCHITECTURE FOR LOCAL PROGRAMMING OF QUANTUM PROCESSOR ELEMENTS USING LATCHING QUBITS", U.S. Pat. No. 8,018,244 entitled "ARCHITECTURE FOR LOCAL PROGRAMMING OF QUANTUM PROCESSOR ELEMENTS USING LATCHING QUBITS", and U.S. Pat. No. 8,169,231 "SYSTEMS, METHODS, AND APPARATUS FOR QUBIT STATE READOUT".

Superconducting shift register 102 may include one or more shift register stages. Each shift register stage may be a latching qubit. Latching qubits are also referred to in the present application as QFPs. Some QFPs in readout system 100 (including some QFPs in superconducting register 102) may be referred to as buffer QFPs in the present application. A buffer QFP is an intermediate element in a communicative coupling between a qubit and a QFP.

Superconducting shift register 102 may employ a three-phase clocking system in order to control the direction of propagation through the constituent latching qubits. A person of skill in the art will appreciate that a plurality of clock signal lines (not illustrated in FIG. 1 to enhance clarity), for example three clock signal lines, may be communicatively coupled to superconducting shift register 102 in order to realize a three-phase clocking system, as taught in U.S. Pat. Nos. 7,843,209, 8,018,244, and 8,169,231.

Superconducting shift register 102 includes a third latching qubit 110 that is communicatively coupleable to DC-SQUID 112 in readout circuit 106. As illustrated, third latching qubit 110 is communicatively coupleable to DC-SQUID 112 via inductive coupling, though a person of skill in the art will appreciate that alternative forms of coupling, for example galvanic coupling, may similarly be used. DC-SQUID 112 is communicatively coupleable to the qubit loop of first superconducting flux qubit 104a via first latching qubit 108a and at least a first subset of the plurality of additional latching qubits in superconducting shift register 102 (including third latching qubit 110), while DC-SQUID 112 is communicatively coupleable to the qubit loop of second superconducting flux qubit 104b via at least second latching qubit 108b and a second subset of the plurality of additional latching qubits in superconducting shift register 102 (including third latching qubit 110).

In operation, first latching qubit 108a and second latching qubit 108b may be used to latch the qubit states of first superconducting flux qubit 104a and second superconducting flux qubit 104b, respectively. These latched qubits states may then be coupled into superconducting shift register 102, either directly or (as illustrated in FIG. 1) through respective additional latching qubits 114a and 114b. Superconducting shift register 102 may then be used to sequentially communicatively couple the latched qubit states of superconducting flux qubits 104a and 104b to DC-SQUID 112 in readout circuit 106. For example, the latched state of first superconducting flux qubit 104a may be communicatively coupled from third latching qubit 110 in superconducting shift register 102 to DC-SQUID 112 in readout circuit 106.

Readout circuit 106 may then be employed to output a signal representative of the state of first superconducting flux qubit 104a. Once the latched state of first superconducting flux qubit 104a has been read out, superconducting shift register 102 may be operated to route the latched state of second superconducting flux qubit 104b to third latching qubit 110 and readout circuit 106 may then be employed to read out the latched state of second superconducting flux qubit 104b. In this way, readout circuit 106 may be used to read out the states of any number of superconducting flux qubits routed through superconducting shift register 102.

In some embodiments, the phase of the drive current controlling readout circuit 106 may be synchronized with the phase of the superconducting shift register 102 clock signals to help keep track of which qubit state is being read out at any given time. In some embodiments, it may be advantageous to perform multiple readout operations of a first qubit state before operating superconducting shift register 102 to shift to a second qubit state. In such embodiments, readout circuit 106 may be operated at a frequency that is faster than the frequency at which superconducting shift register 102 is operated, though the phases of the two signals may still be synchronized (e.g., 1 shift register period per 100 readout circuit periods, etc.).

A person of skill in the art will appreciate that the embodiment of readout system 100 in FIG. 1 is illustrated for exemplary purposes and, in practice, the exact layout, configuration, and number of latching qubits employed may differ in alternative embodiments. For example, additional latching qubits may be employed to mediate some or all of the communicative couplings illustrated in FIG. 1 in order to provide a further degree of isolation between coupled devices and/or to better control the direction of propagation of latched signals. U.S. Pat. Nos. 7,843,209, 8,018,244, and 8,169,231 describe various alternative schematics for superconducting shift registers employing latching qubits, and a person of skill in the art will appreciate that any of those variations, and similarly any further variations, may similarly be employed in the present systems and methods.

U.S. Pat. No. 8,611,974 entitled "SYSTEMS, METHODS AND APPARATUS FOR SUPERCONDUCTING DEMULTIPLEXER CIRCUITS" provides descriptions of demultiplexer circuits in which latching qubits are used as the fundamental switching elements. A demultiplexer circuit employing latching qubits may alternatively be operated in reverse as a multiplexer circuit, and in accordance with the present systems and methods, a multiplexer circuit employing latching qubits may be used to mediate the communicative coupling between multiple superconducting flux qubits and a single readout circuit. That is, in some embodiments, the plurality of additional latching qubits that are configured and arranged to operate as superconducting shift register 102 in readout system 100 may alternatively be configured and arranged to operate as a multiplexer circuit.

The various embodiments described herein provide a method for reading out the state of one or many superconducting flux qubits in, for example, a superconducting quantum processor.

As described above with reference to FIG. 1, the copying can include latching one or more of the QFPs. In their latched state, current flows in the wiring of the QFPs, and the current in the wiring of the QFPs can at least partially polarize the spin-bath described above. The spin-bath polarization caused by the QFP can generate a qubit flux bias (offset). In one implementation, the qubit offset is less than $10\mu\Phi_0$ after spin-bath polarization having a polarization time corresponding to a typical latching time during read-out of approximately 120 µs. The qubit offset decays to approximately $7\mu\Phi_0$ in the remaining time before the start of the next anneal cycle assuming a typical delay of approximately 150 µs between successive anneal cycles.

In some instances, as the examples provided above illustrate, the QFP spin-bath polarization effect can dominate the qubit spin-bath polarization effect. Moreover, unless there is a sufficiently lengthy time delay between successive reads, an uncorrected spin-bath polarization can grow over multiple anneal and readout cycles.

In some implementations, a QFP can be galvanically coupled to a qubit, and can share at least some wiring with the qubit. Spin-bath polarization in the shared wiring caused by the latched current in the wiring of the QFP can generate a flux bias in the QFP and in the coupled qubit.

Flux bias generated in the qubit by the effects described above can decay sufficiently slowly relative to the time between annealing cycles that the flux bias can be present during a subsequent annealing cycle. The net effect can be to bias a qubit toward a solution found in a previous anneal, which can adversely affect performance of the quantum processor by reducing the effectiveness of successive anneals. When the quantum processor is operated as a sampling device, the net effect of the flux bias can be to introduce undesirable correlations between successive samples which can lead to reduced solution diversity.

Spin-bath polarization can also produce a) duty-cycle dependencies on properties of the superconducting integrated circuit, for example mutual inductances and on-chip digital-to-analog converter (DAC) step size, and b) systematic errors in fitting the behavior of single- and multi-qubit systems to thermal distributions.

Mitigating the Effects of Spin-Bath Polarization

Spin-bath polarization and its effect on the performance of a quantum processor have not been recognized previously. Mitigating the effects of spin-bath polarization can include spin-bath depolarization. Mitigating the effects of spin-bath polarization can include passive and active approaches.

Passive Approaches a. One approach is to reduce the time for which the quantum processor stores state information in the body of each qubit. At the end of an annealing cycle, a respective QFP coupled to each qubit is latched immediately, or at least as quickly as practically possible, and the state information stored in the QFP. In an example implementation, state information is stored in the qubit bodies for no more than 5 µs.

b. Another approach is to copy the state of the QFP into the next shift register stage (which can also be a QFP) to eliminate, or at least reduce, a contribution to spin-bath polarization caused by galvanic coupling of each qubit and the respective QFP.

c. Yet another approach is to modify the read-out protocol to eliminate, or at least reduce, a qubit- or QFP-sourced spin-bath polarization by storing qubit state information in the QFP.

d. Yet another approach to mitigating the effects of spin-bath polarization is to introduce a sufficient delay between one annealing cycle and the next annealing cycle to allow the spin-bath polarization to decay i.e., allow enough time for spin-bath depolarization. In an example implementation, depolarization can occur over a timeframe of the order of hundreds of microseconds. One shortcoming of this approach is that introducing a larger delay between annealing cycles can lead to slower processor operation.

e. Yet another approach, for anneal schedules that differ from a standard forward anneal pattern, is to add a passive delay between anneals, the delay at least approximately equal to the duration of the anneal schedule. This approach can be used to avoid correlations between successive annealing runs that would result in a long pause near the end of the anneal schedule that polarizes the spin bath.

f. Yet another approach is to modify duty cycle and programming protocols to minimize, or at least reduce, on-chip heating, and, in particular, to minimize, or at least reduce, fluctuations in temperature. Since the spin-bath polarization signal can be sensitive to temperature, fluctuations in temperature can cause the spin-bath polarization signal to change.

g. Another approach is to modify the fabrication process and/or materials used in fabrication of the superconducting integrated circuit. The amplitude of the spin bath polarization signal can depend on the materials used to fabricate the superconducting integrated circuit, and on the fabrication process.

h. Another approach to mitigating the effects of spin-bath polarization is to raise the temperature to reduce the degree of spin-bath polarization. For example, the quantum processor can be operated at a higher temperature—provided the operating temperature is within the range of temperatures at which the superconducting elements of the chip are superconducting. Raising the temperature can diminish the contribution of quantum dynamics in the annealing operation.

i. Another approach is to replace galvanic coupling of one or more of the qubits to their respective QFPs by non-galvanic coupling.

j. Yet another approach is to replace at least some of the wiring used for inductance by one or more Josephson junctions.

Active Approaches

One active approach to mitigating the effects of spin-bath polarization is described as follows:

Perform an annealing cycle in a conventional manner. As described above, while the qubit barrier is high (i.e., beyond the freeze-out point), the qubit persistent current can bias the spin-bath, and cause spin-bath polarization to increase.

Read out each qubit by shifting the final state of each qubit to a QFP, such that the spin orientation of the QFP reflects the spin orientation of the respective qubit. See FIG. 1 for an example implementation of a read-out system that includes a qubit and a QFP.

Set the CJJ bias of a buffer QFP between a qubit and its respective QFP to zero to cause the buffer QFP to behave as an antiferromagnetic (AFM) coupler.

Keeping the QFP latched, and with the buffer QFP behaving as an AFM coupler, persistent current in the QFP can generate a flux bias in the qubit via the buffer QFP.

Raise the qubit barrier, and, in so doing, cause the qubit state (spin orientation) to be the opposite of the QFP, and the opposite of its final state after the annealing cycle.

Keep the qubit latched for a sufficiently long time to eliminate, or at least reduce, the spin-bath polarization.

Lower the qubit barrier.

Figure 2:
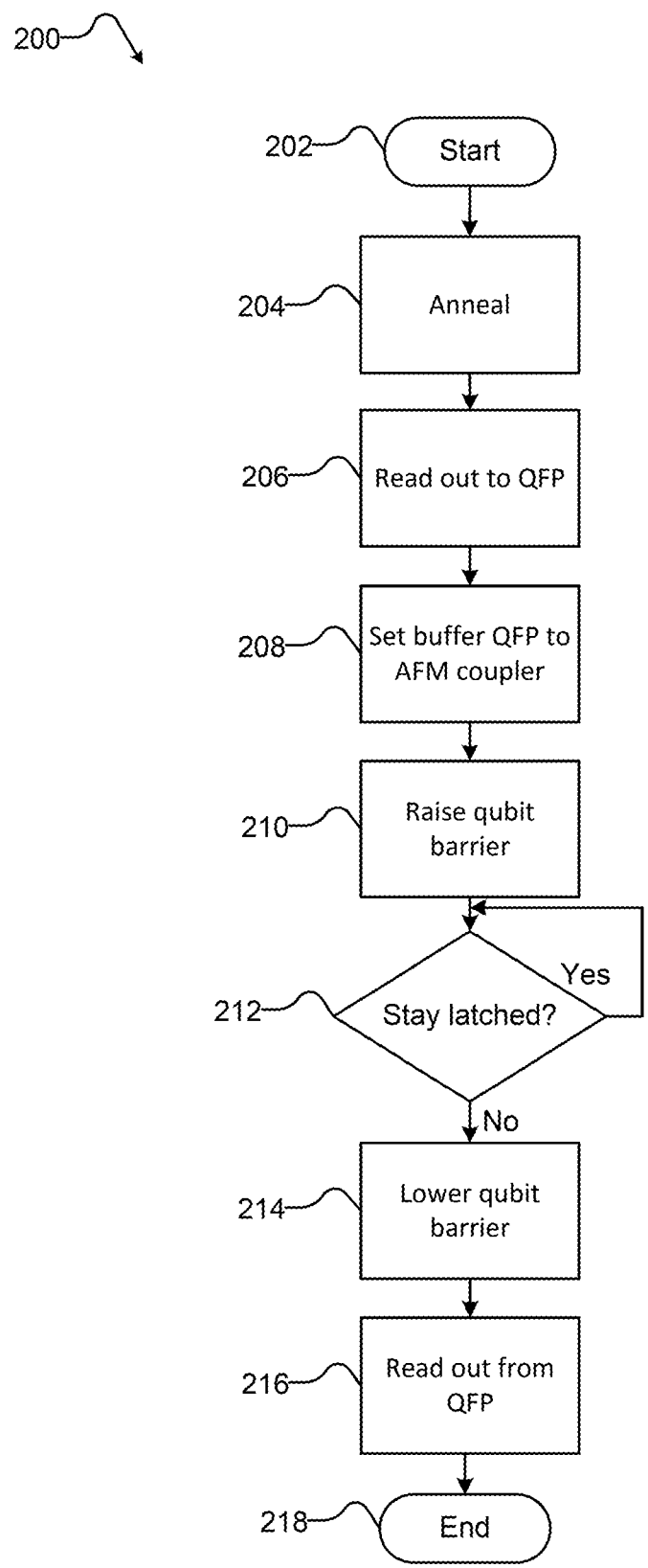
FIG. 2 is a flow chart that illustrates a method of operation of a quantum processor, in accordance with the present systems, devices, articles, and methods.

See FIG. 2 for a flowchart illustrating an example implementation of an active method as described above.

Read out the final qubit state after the annealing cycle from the QFP. In another implementation, the final qubit state is read from the QFP before the spin-bath depolarization.

FIG. 2 is a flow chart that illustrates a method of operation 200 of a quantum processor, in accordance with the present systems, devices, articles, and methods. One or more of the acts in method 200 may be performed by or via one or more circuits, for instance one or more hardware processors in a computational system. In some examples, a device including a hybrid computer (such hybrid computer 600 of FIG. 6 described below) including a quantum annealer performs the acts in method 200.

Method 200 starts at 202, for example in response to an invocation by an invoking program, procedure, routine or function.

At 204, a computational system performs a quantum annealing cycle using a quantum annealer and according to an annealing schedule. At 206, the system reads out the final state of at least one qubit by shifting the final state of the qubit to a respective QFP. The spin orientation of the QFP reflects the spin orientation of its respective qubit.

At 208, the system sets the bias of a buffer QFP between a qubit and its respective QFP to zero to cause the buffer QFP to behave as an antiferromagnetic (AFM) coupler. Setting the bias of the buffer QFP can include setting the compound Josephson junction (CJJ) bias of the buffer QFP. As described above, keeping the QFP latched, and with the buffer QFP behaving as an AFM coupler, persistent current in the QFP can generate a flux bias in the qubit via the buffer QFP.

At 210, the system raises the qubit barrier to cause the qubit state (spin orientation) to be the opposite of the QFP, and the opposite of its final state after the annealing cycle. At 212, the qubit is kept latched for a sufficiently long time to eliminate, or at least reduce, the spin-bath polarization.

At 214, the system lowers the qubit barrier. At 216, the system reads out from the QFP. In another implementation, the system reads out the final qubit state from the qubit after the state has been shifted from the qubit to the QFP (at 206), and before the system performs spin-bath depolarization (at 208 to 214). At 218, the method terminates.

In other implementations, another suitable method is used to readout the qubit. In other implementations, another suitable method is used to flip the state of the qubit.

Since, in general, at least some of the inter-qubit couplers coupled to the qubit may be active, the method can be performed separately in sequence for each of the qubit compound Josephson junction (CJJ) lines to at least reduce the likelihood of swamping the bias from the QFP with a bias from one or more neighboring qubits. In some implementations, there are four qubit CJJ lines. See FIG. 3 for a flowchart illustrating another implementation, the example including separate, sequential activities for two or more qubit CJJ lines.

Figure 3:
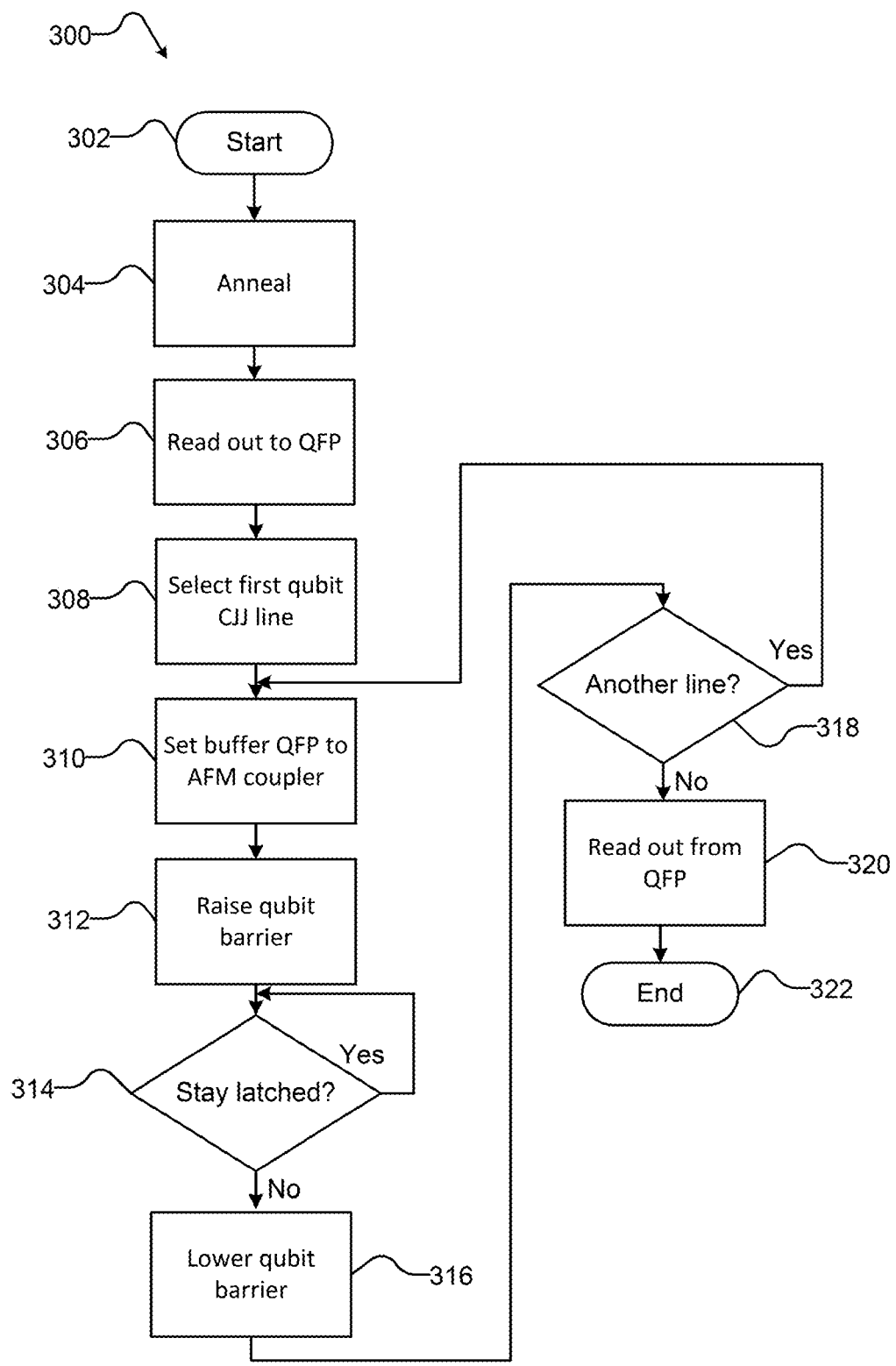
FIG. 3 is a flow chart that illustrates another method of operation of a quantum processor, in accordance with the present systems, devices, articles, and methods.

FIG. 3 is a flow chart that illustrates another method of operation 300 of a quantum processor, in accordance with the present systems, devices, articles, and methods. One or more of the acts in method 300 may be performed by or via one or more circuits, for instance one or more hardware processors in a computational system. In some examples, a device including a hybrid computer (such hybrid computer 600 of FIG. 6 described below) including a quantum annealer performs the acts in method 300.

Method 300 starts at 302, for example in response to an invocation by an invoking program, procedure, routine or function.

At 304, a computational system performs a quantum annealing cycle using a quantum annealer and according to an annealing schedule. At 306, the system reads out the final state of at least one qubit by shifting the final state of the qubit to a respective QFP. The spin orientation of the QFP reflects the spin orientation of its respective qubit.

At 308, the system selected a first qubit CJJ line. At 310, the system sets the bias of a buffer QFP between a qubit and its respective QFP to zero to cause the buffer QFP to behave as an antiferromagnetic (AFM) coupler. Setting the bias of the buffer QFP can include setting the compound Josephson junction (CJJ) bias of the buffer QFP. As described above, keeping the QFP latched, and with the buffer QFP behaving as an AFM coupler, persistent current in the QFP can generate a flux bias in the qubit via the buffer QFP.

At 312, the system raises the qubit barrier to cause the qubit state (spin orientation) to be the opposite of the QFP, and the opposite of its final state after the annealing cycle. At 314, the qubit is kept latched for a sufficiently long time to eliminate, or at least reduce, the spin-bath polarization.

At 316, the system lowers the qubit barrier. At 318, the system determines whether there is another qubit CJJ line to be selected. If yes, then control of method 300 returns to 310. If no, then control of method 300 proceeds to 320, where the system reads out from the QFP. At 322, the method terminates.

In some implementations, the time allocated to eliminating, or at least reducing, spin-bath polarization can be shorter than the annealing cycle, and, in some cases, it can be shorter by an order of magnitude. In practice, the qubit barrier can be raised quickly to a level above the single-qubit freeze-out point, where it can be held for a time, and then lowered quickly.

The latch duration can, in general, depend on a) the main anneal-time, and b) the qubit freeze-out time during the main anneal. For a given anneal time and for a typical freeze-out time, a suitable latch duration can be determined. One approach to determining a suitable latch duration is to measure the degree of depolarization. In an example implementation, the degree of depolarization is measured by measuring a residual spin-vector correlation. If the spin-bath is fully depolarized and the samples are independent, then the residual spin-vector correlation is expected to be zero. The residual spin-vector correlation can be measured for various values of the latch duration, and used (for example by interpolation or extrapolation) to determine the latch duration for which the residual spin-vector correlation is zero.

Figure 4C:
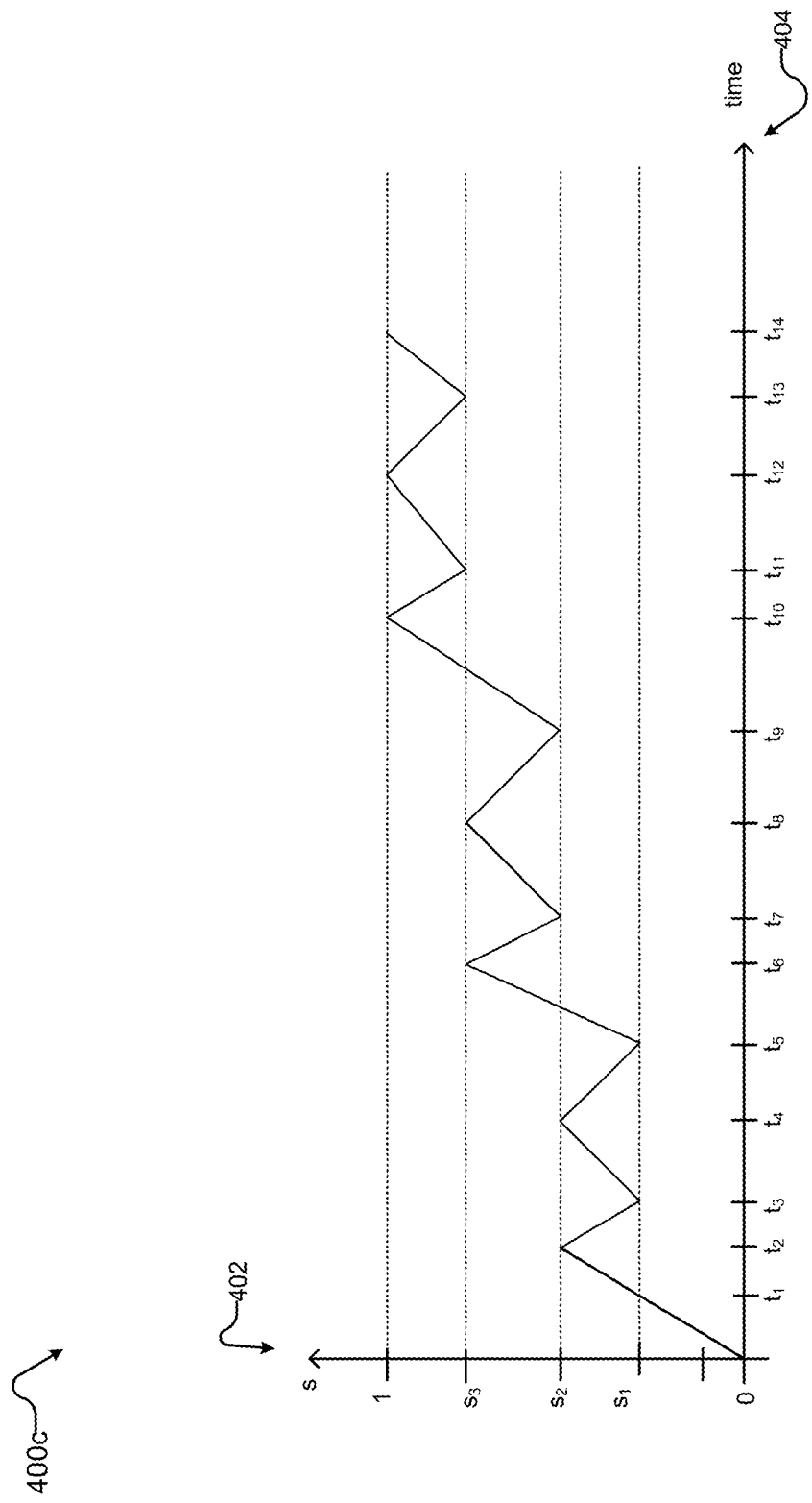

FIGS. 4A, 4B, and 4C show a typical example annealing schedules without active spin-bath depolarization as described above.

FIG. 4A is a graph 400a of an evolution of an analog processor over time. An analog processor may be a quantum processor comprising superconducting qubits and couplers.

Vertical axis 402 represents the normalized evolution coefficient s and the horizontal axis 404 represent the time of the evolution of the analog processor. The normalized evolution coefficient s may represent the normalized flux applied to a compound Josephson junction or the normalized persistent current $i_P$ of a flux qubit. The normalized evolution coefficient s changes monotonically over time, increasing from 0 to a maximum value of 1.

The normalized evolution coefficient can also be referred to as the anneal fraction. The normalized evolution coefficient (or anneal fraction) is a parameter that can vary with time between 0 and 1, and can be used to define an annealing schedule.

A person skilled in the art will understand that the rate of change of the normalized evolution coefficient s over time is shown in FIG. 4A for illustration purposes only and in other implementations the normalized evolution coefficient can increase at a slower or faster rate. In some implementations the normalized evolution coefficient s can change non-linearly. Examples of evolution schedules of analog processors are described in Patent Publication No. US 2015/0363708 entitled "SYSTEMS AND METHODS EMPLOYING NEW EVOLUTION SCHEDULES IN AN ANALOG COMPUTER WITH APPLICATIONS TO DETERMINING ISOMORPHIC GRAPHS AND POST-PROCESSING SOLUTIONS."

Techniques described herein are used to operate a hybrid processor comprising an analog processor and a digital processor where the normalized evolution coefficient s may increase and/or decrease over the course of the operation of the hybrid processor. For certain operations, it may be desirable to operate the hybrid processor such that the analog processor reaches a predetermined classical spin state at the end of a first or initial evolution. This technique may allow study of problem dynamics, or it may be used for obtaining samples from the analog processor.

FIG. 4B is a graph of an example evolution 400b of an analog processor over time, operating with a digital processor to form a hybrid processor according to the present systems, methods and apparatus. An analog processor may comprise a quantum processor. Vertical axis 402 represents the normalized evolution coefficient s and the horizontal axis 404 the time of the evolution of the analog processor.

Before the start of example evolution 400b, the hybrid processor may determine a classical spin state and apply one or more preparatory biases to the analog processor to target the evolution of the analog processor towards the classical spin state. Preparatory biases may be applied via the analog processor's circuitry components, for example via on-chip DACs or analog lines. Preparatory biases may influence the evolution of the analog processor towards a classical state. When the analog processor is a quantum processor with n qubits, there are $2^n$ classical states.

In example evolution 400b the normalized evolution coefficient s increases from a value of 0 at time t=0 to a value of 1 at time $t_1$. A person skilled in the art will understand that the rate of the evolution from time t=0 to $t_1$ is shown in FIG. 4B for illustration purposes only and in other implementations the rate of the evolution of the analog processor from 0 to $t_1$ may be faster or slower than illustrated.

At $t_1$, the evolution is paused until time $t_2$. During the time interval between $t_1$ and $t_2$, shown in FIG. 4B as time interval 406, the digital processor may, for example, remove the preparatory biases applied before the start of example evolution 400b. A person skilled in the art will understand that time interval 406 can be dependent, at least in part, on the particular hardware and configuration of the analog processor, and the digital processor comprising the hybrid processor. The time taken by the digital processor to reprogram the analog processor and remove the applied preparatory biases may be different than shown in FIG. 4B. In some implementations, time interval 406 may range, for example, from 100 µs to 200 µs. When the analog processor is a quantum processor, the digital processor may pause the evolution and retain the target classical spin state by keeping the energy barrier of the qubits high.

Additionally or in alternative, the hybrid processor may pause the evolution of the analog processor for a time interval longer than needed to reprogram the analog processor, thereby performing other operations, such as readout or post-processing, during time interval 406, in addition or in place of reprogramming the analog processor.

After time interval 406, the evolution of the analog processor resumes in a direction opposite the direction before time interval 406, i.e., backwards (also referred to in the present application as in a reverse direction). Annealing in the reverse direction is also referred to in the present application as reverse annealing. During reverse annealing, the normalized evolution coefficient s decreases from 1 to a value s* at time $t_3$. The digital processor may determine the value of s* before the start of example evolution 400b, or during time interval 406.

Where the analog processor is a quantum processor, after time interval 406, the energy barriers of the qubits are lowered until an intermediate transverse field and/or tunneling energy is reached. The intermediate transverse field and/or tunneling energy may be determined by the digital processor.

After time $t_3$, the evolution of the analog processor is paused for a time interval 408 (between times $t_3$ and $t_4$). Time interval 408 may be determined by the digital processor, either before the start of example evolution 400b or during time interval 406. In some implementations, time interval 408 may, for example, range from 1 µs to several milliseconds.

A person skilled in the art will understand that the rate of change of the normalized evolution coefficient s between time $t_2$ and time $t_3$ may be the same as the rate of change between 0 and time $t_1$, or may be different. The digital processor may, for example, determine the rate of change of the normalized evolution coefficient.

After time interval 408, the evolution of the analog processor resumes in the same direction as the evolution from 0 to time $t_1$, i.e., the normalized evolution coefficient s increases from value s* to 1 until the analog processor reaches a classical spin state at time $t_5$. Where the analog processor is a quantum processor, the digital processor may raise the energy barriers of the qubits to reach a classical spin state. The classical spin state reached at time $t_5$ may not be the same as the classical spin state reached at time $t_1$, given that the preparatory biases have been removed at time interval 406.

After time $t_5$, the digital processor may read out the classical spin state reached at $t_5$. In some implementations, the digital processor may perform post-processing.

Alternatively, or in addition, post-processing may be used to improve samples obtained by the analog processor at time $t_1$. In an effort to improve the diversity of the samples obtained from the analog processor, the samples obtained at $t_1$ can be post-processed as described above and used as feedback to run the evolution of the analog processor one or more times.

FIG. 4C is a graph of an example evolution 400c of an analog processor, operating with a digital processor to form a hybrid processor according to the present systems, methods and apparatus, where the analog processor evolves forwards and backwards over several intervals. An analog processor may comprise a quantum processor. Vertical axis 402 represents the normalized evolution coefficient s and the horizontal axis 404 the time of the evolution of the analog processor.

Before the start of the evolution the digital processor may program a problem onto the analog processor. Where the analog processor is a quantum processor, the digital processor may, for example, assign bias and coupling strengths to some, or all, of the qubits and couplers of the quantum processor. The digital processor determines an annealing schedule for the analog processor (e.g., the digital processor may determine the rate of the anneal).

In example evolution 400, the normalized evolution coefficient s increases from 0 to a value $s_1$ in time $t_1$. A person skilled in the art will understand that the rate of the evolution from 0 to $t_1$ is shown in FIG. 4 for illustration purposes only and in other implementations the rate of the evolution of the analog processor from 0 to $s_1$ may be faster of slower than illustrated. In addition, where the analog processor is a quantum processor, some of the qubits in the quantum processor may have a different annealing rate than other qubits or they may start annealing at a later time.

At time $t_1$ the digital processor programs the analog processor with a first candidate annealing schedule. The first candidate annealing schedule may be the same as the initial annealing schedule determined by the digital processor before the start of the evolution.

At time $t_1$ the evolution of the analog processor may be paused for a time necessary to program the candidate annealing schedule (not shown in FIG. 4) or for other purposes, before resuming until the normalized evolution coefficient s reaches value $s_2$ at time $t_2$, where $s_2>s_1$. The values $s_1$ and $s_2$, and/or $t_1$ and $t_2$, may be determined by the digital processor before the start of the evolution and may be determined, at least in part, by the class of problem that is to be programmed into the analog processor.

At time $t_2$ the evolution of the analog processor proceeds in an opposite direction (i.e., backwards) with respect to the direction of the evolution up to time $t_2$. At time $t_3$ the normalized evolution coefficient s decreases to value $s_1$.

At time $t_3$ the digital processor programs the analog processor with a second candidate annealing schedule that may be different from the first candidate annealing schedule. The evolution of the analog processor may be paused for the time needed to program the second candidate annealing schedule into the analog processor.

After time $t_3$ the evolution of the analog processor proceeds in the first direction (i.e., forward) until a time $t_4$ when the normalized evolution coefficient s reaches value $s_2$ again, before proceeding in the opposite direction (i.e., backwards) until the normalized evolution coefficient reaches value $s_1$ at time $t_5$.

At times $t_2$ and $t_4$, the digital processor may readout the spin configurations of the analog processor.

While in FIG. 4 the evolution of the analog processor is shown to move forward and backwards between the values $s_1$ and $s_2$ two times, a person skilled in the art will understand that the analog processor may evolve between $s_1$ and $s_2$ more than two times, or only once.

Similarly, the evolution of the analog processor proceeds forwards and backwards between $s_2$ and $s_3$, and successively between values of the normalized evolution coefficient $s_3$ and 1.

Although in FIGS. 4A-4C the evolution of the analog processor is shown to proceeds forwards and backwards between three values $s_1$-$s_3$ of the normalized evolution coefficient s, a person skilled in the art will understand that the evolution of the analog processor may proceed as described between less than three or more than three values of the normalized evolution coefficient s.

At time $t_{14}$, after intervening times $t_6$ through $t_{13}$, the analog processor can have tried a number of candidate annealing schedules between intervals of the normalized evolution coefficient s to attempt to find an optimal annealing schedule for each interval. Depending on the problem, or problem class, to be solved by the analog processor, a specific annealing schedule may be more suited than others to find, for example, a more diverse set of samples, a solution with a lower energy, or a solution that requires less post-processing.

Figure 5:
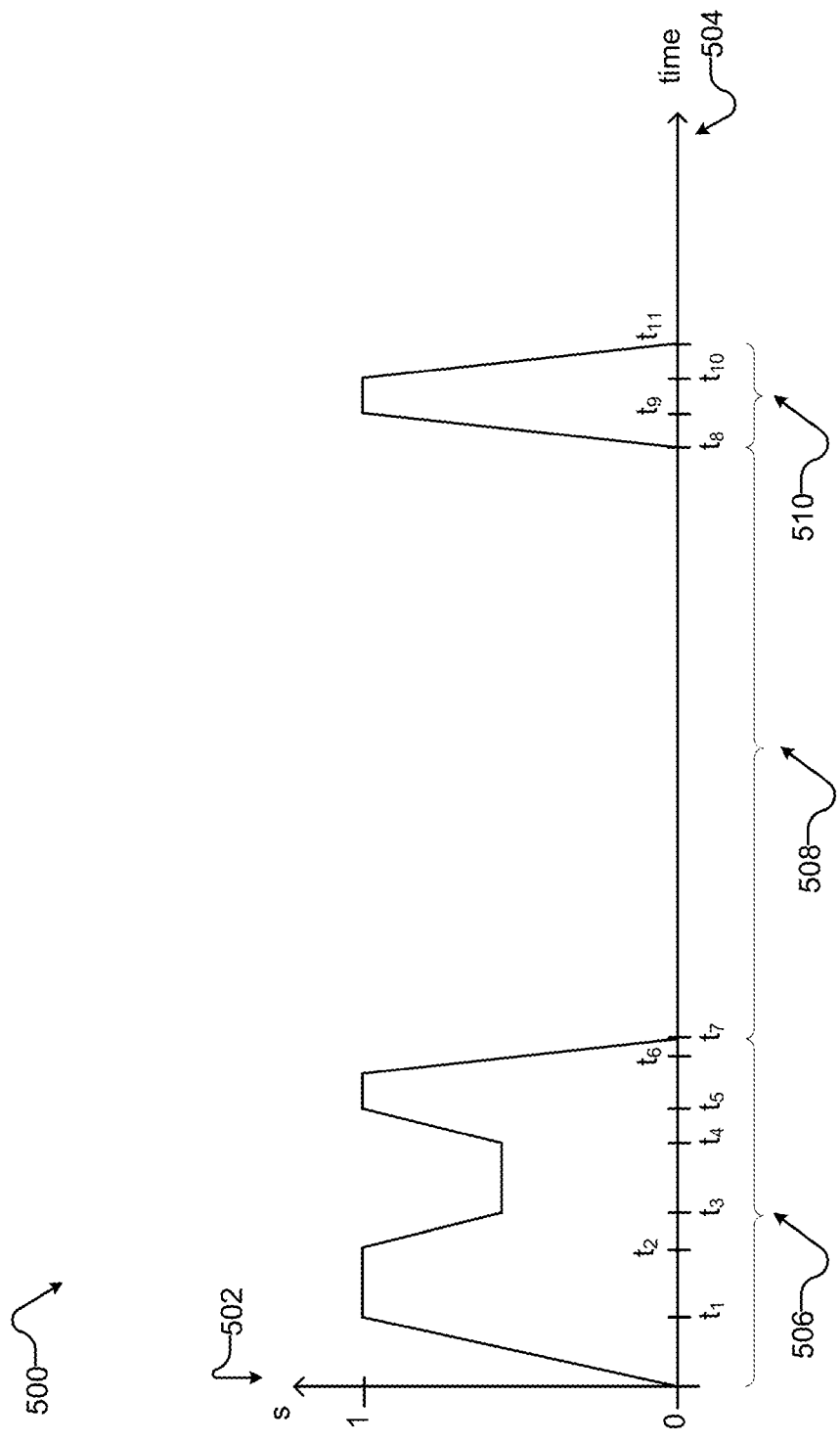
FIG. 5 is a timing diagram that illustrates another annealing schedule for a quantum processor, in accordance with the present systems, devices, articles, and methods.

FIG. 5 shows an example two-stage annealing schedule 500 in accordance with the systems and methods described above. FIG. 5 shows an example of active spin-bath depolarization as described above.

FIG. 5 is a graph of an example annealing schedule 500 of an analog processor, operating with a digital processor to form a hybrid processor, where the analog processor evolves forwards and backwards over several intervals. An analog processor may comprise a quantum processor. Vertical axis 502 represents the normalized evolution coefficient s and the horizontal axis 504 the time of the evolution of the analog processor.

In example evolution 500, the normalized evolution coefficient s increases from 0 at time t=0 to a value of 1 at time $t_1$. A person skilled in the art will understand that the rate of the evolution from 0 to $t_1$ is shown in FIG. 5 for illustration purposes only and in other implementations the rate of the evolution of the analog processor may be faster of slower than illustrated. In addition, where the analog processor is a quantum processor, some of the qubits in the quantum processor may have a different annealing rate than other qubits or they may start annealing at a later time.

At $t_1$, the evolution is paused until time $t_2$. At time $t_2$, the evolution of the analog processor resumes in the reverse direction to time $t_3$. At $t_3$, the evolution is paused until time $t_4$. At time $t_4$, the evolution of the analog processor resumes in the forward direction to time $t_5$. At $t_5$, the evolution is paused until time $t_6$. At time $t_6$, the evolution of the analog processor resumes in the reverse direction to time $t_7$.

Time period 506 is referred to in the present application as the main anneal or the main annealing time. At $t_7$, the main anneal is complete, and the annealing operations of the hybrid processor are paused until time $t_8$. Time period 508 is the time period of the pause. During time period 508, a qubit can be readout to a QFP, a buffer QFP configured as an AFM coupler, and the state of the qubit flipped to the opposite state to its final state after the main anneal. At time $t_8$, the hybrid processor performs a secondary anneal to perform the spin-bath depolarization as described above.

At time $t_9$, the qubit barrier is raised. The qubit is latched in the opposite state to its final state after the main anneal until time $t_{10}$. The qubit barrier is lowered, and the secondary anneal is complete at time $t_{11}$. Time period 510 is referred to in the present application as the secondary anneal or secondary annealing time or active spin-bath depolarization time.

A person skilled in the art will understand that annealing schedule 500 shown in FIG. 5 (including the rates of change of the normalized evolution coefficient s over time, the pause durations, and the number of changes of direction of anneal)

is for illustration purposes only. In other implementations, the annealing schedule can vary including the rates of change of the normalized evolution coefficient s over time, the pause durations, and the number of changes of direction of anneal. In some implementations the normalized evolution coefficient s can change non-linearly.

The method described above includes the flipping of the state of a qubit (from its final state after the annealing cycle to the opposite state via the QFP buffer). The flipping of the state can occur on a timeframe of the order of 1 µs, and can be performed without having to read out the state of the qubit via a shift register and a non-destructive read-out circuit.

In some implementations, the method described above can be applied to reverse annealing.

In some implementations, spin-bath depolarization can be fine-tuned by controls provided via an interface to the quantum processor. For example, a control can be provided to adjust the depolarization duration discussed above.

In other implementations, the amount of depolarization can be adjusted based on annealing parameters e.g., anneal-time. In some implementations, the amount of depolarization can be adjusted automatically i.e. without manual intervention. In some implementations, automatic adjustment of the amount of depolarization can be used with annealing schedule that includes reverse annealing.

In other implementations, active control of spin-bath polarization and/or depolarization is used to reduce flux offsets and 1/f flux noise.

In other implementations, methods to mitigate spin-bath polarization can include depolarization of the QFP.

Hybrid Computing System Comprising a Quantum Processor

Figure 6:
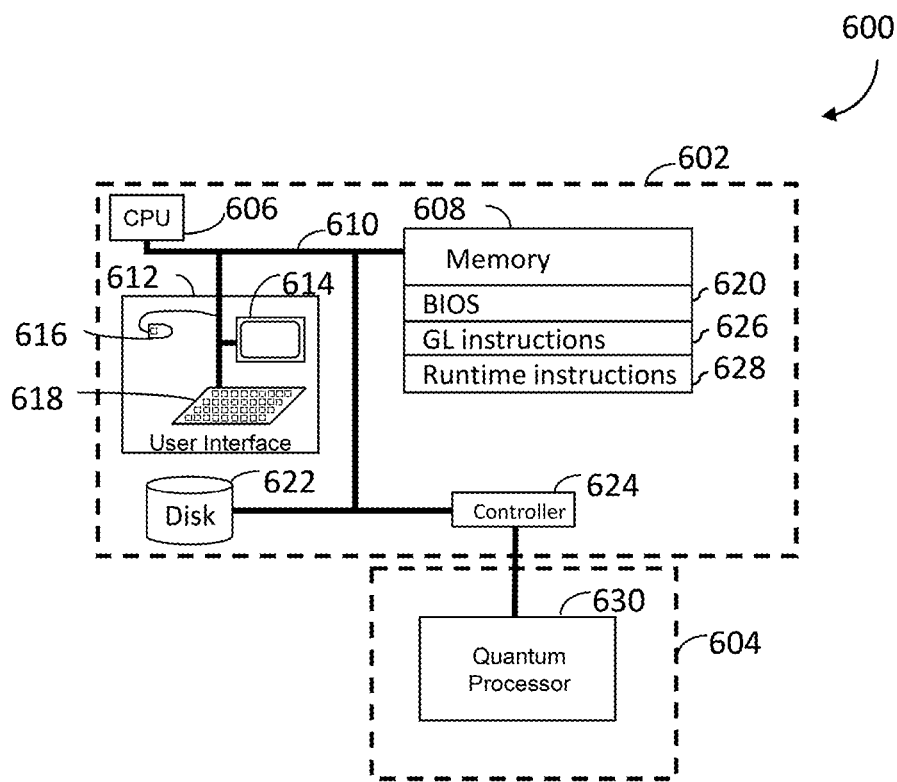
FIG. 6 is a block diagram of an example implementation of a hybrid computer, in accordance with the present systems, devices, articles, and methods.

FIG. 6 illustrates a hybrid computing system 600 including a digital computer 602 coupled to an analog computer 604. In some implementations, the analog computer 604 is a quantum computer and the digital computer 602 is a classical computer.

The exemplary digital computer 602 includes a digital processor (such as one or more central processor units 606) that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like, when properly configured or programmed to form special purpose machines, and/or when communicatively coupled to control an analog computer, for instance a quantum computer.

Digital computer 602 will at times be referred to in the singular herein, but this is not intended to limit the application to a single digital computer. The present systems and methods can also be practiced in distributed computing environments, where tasks or sets of instructions are performed or executed by remote processing devices, which are linked through a communications network. In a distributed computing environment computer- or processor-readable instructions (sometimes known as program modules), application programs and/or data, may be located in both local and remote memory storage devices (e.g., nontransitory computer- or processor-readable media).

Digital computer 602 may include at least one or more digital processors (e.g., one or more central processor units 606), one or more system memories 608, and one or more system buses 610 that couples various system components, including system memory 608 to central processor unit 606.

The digital processor may be any logic processing unit, such as one or more central processing units ("CPUs") with one or more cores, graphics processing units ("GPUs"), digital signal processors ("DSPs"), application-specific integrated circuits ("ASICs"), field-programmable gate arrays ("FPGAs"), programmable logic controllers (PLCs), etc.

Digital computer 602 may include a user input/output subsystem 612. In some implementations, the user input/output subsystem includes one or more user input/output components such as a display 614, mouse 616, and/or keyboard 618. System bus 610 can employ any known bus structures or architectures, including a memory bus with a memory controller, a peripheral bus, and a local bus. System memory 608 may include non-volatile memory, for example one or more of read-only memory ("ROM"), static random access memory ("SRAM"), Flash NAND; and volatile memory, for example random access memory ("RAM") (not shown), all of which are examples of nontransitory computer- or processor-readable media.

A basic input/output system ("BIOS") 620, which can form part of the ROM, contains basic routines that help transfer information between elements within digital computer 602, such as during startup.

Digital computer 602 may also include other non-volatile memory 622. Non-volatile memory 622 may take a variety of forms, including: a hard disk drive for reading from and writing to a hard disk, an optical disk drive for reading from and writing to removable optical disks, and/or a magnetic disk drive for reading from and writing to magnetic disks, all of which are examples of nontransitory computer- or processor-readable media. The optical disk can be a CD-ROM or DVD, while the magnetic disk can be a magnetic floppy disk or diskette. Non-volatile memory 622 may communicate with digital processor via system bus 610 and may include appropriate interfaces or controllers 624 coupled to system bus 610. Non-volatile memory 622 may serve as nontransitory long-term storage for computer- or processor-readable instructions, data structures, or other data (also called program modules) for digital computer 602.

Although digital computer 602 has been described as employing hard disks, optical disks and/or magnetic disks, those skilled in the relevant art will appreciate that other types of non-volatile computer-readable media may be employed, such a magnetic cassettes, flash memory cards, Flash, ROMs, smart cards, etc., all of which are further examples of nontransitory computer- or processor-readable media. Those skilled in the relevant art will appreciate that some computer architectures conflate volatile memory and non-volatile memory. For example, data in volatile memory can be cached to non-volatile memory, or a solid-state disk that employs integrated circuits to provide non-volatile memory. Some computers place data traditionally stored on disk in memory. As well, some media that are traditionally regarded as volatile can have a non-volatile form, e.g., Non-Volatile Dual In-line Memory Module variation of Dual In Line Memory Modules.

Various sets of computer- or processor-readable instructions (also called program modules), application programs and/or data can be stored in system memory 608. For example, system memory 608 may store instructions 626, and a set of run-time instructions 628.

While shown in FIG. 6 as being stored in system memory 608, the modules shown and other data can also be stored elsewhere including in non-volatile memory 622 or one or more other non-transitory computer- or processor-readable media.

The analog computer 604 can be provided in an isolated environment (not shown). For example, where the analog computer 604 is a quantum computer, the environment shields the internal elements of the quantum computer from heat, magnetic field, and the like. The analog computer 604 includes one or more analog processors 630. Examples of analog processor 630 include quantum processors such as those described below in reference to FIG. 7.

A quantum processor includes programmable elements such as qubits, couplers, and other devices. The qubits are read out via readout system (not shown in FIG. 7). See for example FIG. 1. These results are fed to the various sets of computer- or processor-readable instructions for the digital computer 602. In some embodiments, hybrid computer 100 is used to implement quantum annealing, as described herein, on analog processor 630.

In some implementations, the digital computer 602 can operate in a networked environment using logical connections to at least one client computer system. In some implementations, the digital computer 602 is coupled via logical connections to at least one database system. These logical connections may be formed using any means of digital communication, for example, through a network, such as a local area network ("LAN") or a wide area network ("WAN") including, for example, the Internet. The networked environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 602 may be connected to the LAN through an adapter or network interface card ("NIC") (communicatively linked to system bus 610). When used in a WAN networked environment, digital computer 602 may include an interface and modem (not shown), or a device such as NIC, for establishing communications over the WAN. Non-networked communications may additionally, or alternatively, be employed.

In accordance with some embodiments of the present systems and devices, a quantum processor (such quantum processor 630) may be designed to perform quantum annealing and/or adiabatic quantum computation. An evolution Hamiltonian is constructed, that is proportional to the sum of a first term proportional to a problem Hamiltonian and a second term proportional to a delocalization Hamiltonian, as follows:

$$H_E \propto A(t)H_P + B(t)H_D$$

where $H_E$ is the evolution Hamiltonian, $H_P$ is the problem Hamiltonian, $H_D$ is the delocalization Hamiltonian, and A(t), B(t) are coefficients that can control the rate of evolution, and typically lie in the range [0,1].

In some implementations, a time-varying envelope function is placed on the problem Hamiltonian. A suitable delocalization Hamiltonian is given by:

$$H_D \propto -\frac{1}{2}\sum_{i=1}^{N}\Delta_i \sigma_i^x$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms.

A common problem Hamiltonian includes a first component proportional to diagonal single qubit terms, and a second component proportional to diagonal multi-qubit terms, and may be of the following form:

$$H_P \propto -\frac{\varepsilon}{2}\left[\sum_{i=1}^{N}h_i\sigma_i^z + \sum_{j>i}^{N}J_{ij}\sigma_i^z\sigma_j^z\right]$$

where N represents the number of qubits, $\sigma_i^z$ is the Pauli z-matrix for the $i^{th}$ qubit, $h_i$ and $J_{ij}$ are dimensionless local fields for the qubits, and couplings between qubits, respectively, and $\varepsilon$ is a characteristic energy scale for $H_P$.

The $\sigma_i^z$ and $\sigma_i^z\sigma_j^z$ terms are examples of "diagonal" terms. The former is a single qubit term and the latter a two qubit term.

Throughout this specification, the terms "problem Hamiltonian" and "final Hamiltonian" are used interchangeably unless the context dictates otherwise. Certain states of the quantum processor are, energetically preferred, or simply preferred by the problem Hamiltonian. These include the ground states but may include excited states.

Hamiltonians such as $H_D$ and $H_P$ in the above two equations, respectively, may be physically realized in a variety of different ways. A particular example is realized by an implementation of superconducting qubits.

Exemplary Superconducting Quantum Processor for Quantum Annealing

Figure 7:
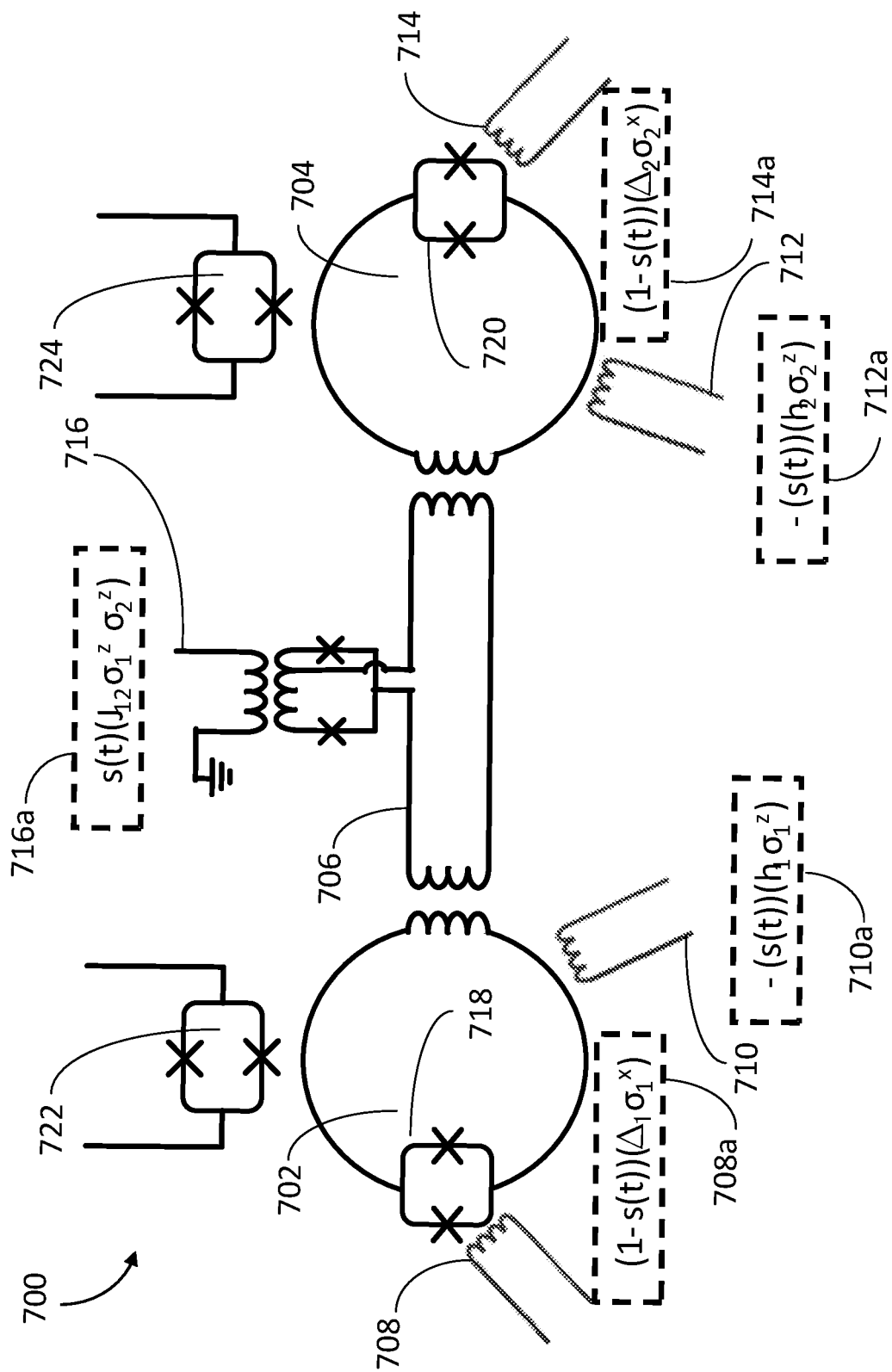
FIG. 7 is a schematic diagram of an example implementation of a portion of a quantum processor, in accordance with the present systems, devices, articles, and methods.

FIG. 7 is a schematic diagram of a portion of an exemplary superconducting quantum processor 700 designed for quantum annealing (and/or adiabatic quantum computing) components from which may be used to implement the present systems and devices. The portion of superconducting quantum processor 700 shown in FIG. 7 includes two superconducting qubits 702, and 704. Also shown is a tunable $\sigma_i^z\sigma_j^z$ coupling (diagonal coupling) via coupler 710 therebetween qubits 702 and 704 (i.e., providing 2-local interaction). While the portion of quantum processor 700 shown in FIG. 7 includes only two qubits 702, 704 and one coupler 706, those of skill in the art will appreciate that quantum processor 700 may include any number of qubits and any number of couplers coupling information therebetween.

The portion of quantum processor 700 shown in FIG. 7 may be implemented to physically realize quantum annealing and/or adiabatic quantum computing. Quantum processor 700 includes a plurality of interfaces 708, 710, 712, 714, and 716 that are used to configure and control the state of quantum processor 700. Each of interfaces 708, 710, 712, 714, and 716 may be realized by a respective inductive coupling structure, as illustrated, as part of a programming subsystem and/or an evolution subsystem. Such a programming subsystem and/or evolution subsystem may be separate from quantum processor 700, or it may be included locally (i.e., on-chip with quantum processor 700) as described in, for example, U.S. Pat. Nos. 7,876,248 and 8,035,540.

In the operation of quantum processor 700, interfaces 708 and 714 may each be used to couple a flux signal into a respective compound Josephson junction 718 and 720 of qubits 702 and 704, thereby realizing a tunable tunneling term (the $\Delta_i$ term) in the system Hamiltonian. This coupling provides the off-diagonal $\sigma^x$ terms of the Hamiltonian and these flux signals are examples of "delocalization signals".

In some implementations, the tunneling term is selected to make a first portion of the qubits on the quantum processor more classical relative a second portion of the qubits. For example, qubit 702 may be a hidden unit in a Boltzmann machine and have a smaller tunneling term relative to qubit 704.

Similarly, interfaces 710 and 712 may each be used to apply a flux signal into a respective qubit loop of qubits 702 and 704, thereby realizing the $h_i$ terms in the system Hamiltonian. This coupling provides the diagonal $\sigma^z$ terms in the system Hamiltonian. Furthermore, interface 716 may be used to couple a flux signal into coupler 706, thereby realizing the $J_{ij}$ term(s) in the system Hamiltonian. This coupling provides the diagonal $\sigma_i^z \sigma_j^z$ terms in the system Hamiltonian.

In FIG. 7, the contribution of each of interfaces 708, 710, 712, 714, and 716 to the system Hamiltonian is indicated in boxes 708a, 710a, 712a, 714a, and 716a, respectively. As shown, in the example of FIG. 7, the boxes 708a, 710a, 712a, 714a, and 716a are elements of time-varying Hamiltonians for quantum annealing and/or adiabatic quantum computing.

Throughout this specification and the appended claims, the term "quantum processor" is used to generally describe a collection of physical qubits (e.g., qubits 702 and 704) and couplers (e.g., coupler 706). The physical qubits 702 and 704 and the coupler 706 are referred to as the "programmable elements" of the quantum processor 700 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 710, 712, and 716) used to apply the programmable parameters (e.g., the $h_i$ and $J_{ij}$ terms) to the programmable elements of the quantum processor 700 and other associated control circuitry and/or instructions.

As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" generally includes the interfaces (e.g., "evolution interfaces" 708 and 714) used to evolve the programmable elements of the quantum processor 700 and other associated control circuitry and/or instructions. For example, the evolution subsystem may include annealing signal lines and their corresponding interfaces (708, 714) to the qubits (702, 704).

Quantum processor 700 also includes readout devices 722 and 724, where readout device 722 is associated with qubit 702 and readout device 724 is associated with qubit 704. In some embodiments, such as shown in FIG. 7, each of readout devices 722 and 724 includes a DC-SQUID inductively coupled to the corresponding qubit. In the context of quantum processor 700, the term "readout subsystem" is used to generally describe the readout devices 722, 724 used to read out the final states of the qubits (e.g., qubits 702 and 704) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication WO2012064974.

While FIG. 7 illustrates only two physical qubits 702, 704, one coupler 706, and two readout devices 722, 724, a quantum processor (e.g., processor 700) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Examples of superconducting qubits include superconducting flux qubits, superconducting charge qubits, and the like. In a superconducting flux qubit the Josephson energy dominates or is equal to the charging energy. In a charge qubit it is the reverse. Examples of flux qubits that may be used include rf-SQUIDs, which include a superconducting loop interrupted by one Josephson junction, persistent current qubits, which include a superconducting loop interrupted by three Josephson junctions, and the like. See, examples of rf-SQUID qubits in Bocko, et al., 1997, *IEEE Trans. on Appl. Supercond.* 7, 3638; Friedman, et al., 2000, *Nature* 406, 43; and Harris, et al., 2010, *Phys. Rev. B* 81, 134510; or persistent current qubits, Mooij et al., 1999, *Science* 285, 1036; and Orlando et al., 1999, *Phys. Rev. B* 60, 15398. In addition, hybrid charge-phase qubits, where the energies are equal, may also be used. Further details of superconducting qubits may be found in Makhlin, et al., 2001, *Rev. Mod. Phys.* 73, 357; Devoret et al., 2004, arXiv:cond-mat/0411174; Zagoskin and Blais, 2007, *Physics in Canada* 63, 215; Clarke and Wilhelm, 2008, *Nature* 453, 1031; Martinis, 2009, *Quantum Inf. Process.* 8, 81; and Devoret and Schoelkopf, 2013, *Science* 339, 1169. In some embodiments, the qubits and couplers are controlled by on chip circuitry. Examples of on-chip control circuitry can be found in U.S. Pat. Nos. 7,876,248; 7,843,209; 8,018,244; 8,098,179; 8,169,231; and 8,786,476. Further details and implementations of exemplary quantum processors that may be used in conjunction with the present systems and devices are described in, for example, U.S. Pat. Nos. 7,533,068; 8,008,942; 8,195,596; 8,190,548; and 8,421,053.

The above described method(s), process(es), or technique(s) could be implemented by a series of processor readable instructions stored on one or more nontransitory processor-readable media. Some examples of the above described method(s), process(es), or technique(s) method are performed in part by a specialized device such as an adiabatic quantum computer or a quantum annealer or a system to program or otherwise control operation of an adiabatic quantum computer or a quantum annealer, for instance a computer that includes at least one digital processor. The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processors, not necessarily the exemplary quantum processors generally described above.

The various embodiments described above can be combined to provide further embodiments. To the extent that they are not inconsistent with the specific teachings and definitions herein, all of the US patents, US patent application publications, US patent applications referred to in this specification and/or listed in the Application Data Sheet, including International PCT Patent Application Publication No. WO2009039634A1 entitled "SYSTEMS, METHODS, AND APPARATUS FOR QUBIT STATE READOUT"; International PCT Patent Application Publication No. WO2012064974A2 entitled "SUPERCONDUCTING FLUX QUBIT READOUT"; International PCT Patent Application Publication No. WO2016183213A1 entitled "FREQUENCY MULTIPLEXED RESONATOR INPUT AND/OR OUTPUT FOR A SUPERCONDUCTING DEVICE"; and U.S. Provisional Patent Application Ser. No. 62/530,052 entitled "SUPERCONDUCTING QUANTUM PROCESSOR AND METHOD OF OPERATING SAME", are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operation of a hybrid computing system comprising a quantum processor, the quantum processor comprising at least one qubit, the method comprising:
   performing a first quantum evolution by the quantum processor, the at least one qubit having a first state after the first quantum evolution; and
   actively mitigating by the quantum processor a spin-bath polarization of at least a portion of the quantum processor, actively mitigating by the quantum processor comprising:
      inducing a second state in the at least one qubit, the second state selected to reduce the spin-bath polarization;
      raising a tunneling barrier of the at least one qubit;
      latching the at least one qubit in the second state to reduce the spin-bath polarization; and
      lowering the tunneling barrier of the at least one qubit after a determined duration.

2. The method of claim 1 wherein the quantum processor includes a plurality of superconducting qubits, and wherein performing the first quantum annealing evolution by the quantum processor includes performing a first quantum annealing cycle by the quantum processor to generate the first state of the at least one qubit of the plurality of superconducting qubits.

3. The method of claim 1 further comprising reading out the first state of the at least one qubit.

4. The method of claim 2 further comprising performing a second quantum annealing cycle by the quantum processor after actively mitigating by the quantum processor the spin-bath polarization.

5. The method of claim 4 wherein performing a second quantum annealing cycle by the quantum processor after actively mitigating by the quantum processor the spin-bath polarization includes performing a second quantum annealing cycle by the quantum processor after ceasing actively mitigating by the quantum processor the spin-bath polarization.

6. The method of claim 3 wherein reading out the first state of the qubit includes:
   raising a tunneling barrier of the qubit; and
   shifting the first state of the qubit to a quantum flux parametron (QFP).

7. The method of claim 6 wherein shifting the first state of the qubit to a QFP includes causing a spin orientation of the QFP to be the same as a spin orientation of the qubit.

8. The method of claim 6, wherein inducing a second state in the at least one qubit comprises:
   causing a buffer QFP to behave as an antiferromagnetic (AFM) coupler, the buffer QFP providing AFM coupling between the qubit and the QFP.

9. The method of claim 8 wherein causing a buffer QFP to behave as an antiferromagnetic (AFM) coupler includes setting a compound Josephson junction (CJJ) bias of a buffer QFP to zero.

10. The method of claim 1 wherein actively mitigating a spin-bath polarization includes at least partially depolarizing by the quantum processor the spin-bath polarization.

11. The method of claim 1 wherein inducing a second state in the at least one qubit includes flipping the first state of the at least one qubit of the quantum processor to a second state opposite the first state.

12. The method of claim 11 wherein flipping the first state of the qubit of the quantum processor to a second state opposite the first state includes:
   reading out the first state of the qubit; and
   causing the state of the qubit to be the opposite state of the first state.

13. The method of claim 2 wherein performing an annealing cycle by the quantum processor to generate a first state of a qubit of the quantum processor includes performing an annealing cycle by the quantum processor to generate a first spin orientation of a qubit of the quantum processor.

14. The method of claim 13 wherein inducing a second state in the at least one qubit includes flipping the first state of the at least one qubit of the quantum processor to a second spin orientation, the second spin orientation opposite to the first spin orientation.

15. A hybrid computing system comprising:
   a quantum processor comprising at least one qubit, and
   a control system comprising circuitry communicatively coupled to control and to readout from the quantum processor, the control system which in response to executable control logic:
   performs a first quantum evolution by the quantum processor, the at least one qubit having a first state after the first quantum evolution; and
   induces a second state in the at least one qubit, the second state selected to reduce a spin-bath polarization;

raises a tunneling barrier of the at least one qubit;
latches the at least one qubit in the second state to actively mitigate by the quantum processor the spin-bath polarization of at least a portion of the quantum processor; and
lowers the tunneling barrier of the at least one qubit after a determined duration.

16. The hybrid computing system of claim 15 wherein the quantum processor includes a plurality of superconducting qubits, and wherein to perform the first quantum evolution by the quantum processor the control system causes the quantum processor perform a first quantum annealing cycle to generate the first state of the at least one qubit of the plurality of superconducting qubits.

17. The hybrid computing system of claim 15 wherein the control system further causes the first state of the at least one qubit to be read out.

18. The hybrid computing system of claim 16 wherein the control system further causes performance of a second quantum annealing cycle by the quantum processor after active mitigation by the quantum processor of the spin-bath polarization.

19. The hybrid computing system of claim 18 wherein to perform a second quantum annealing cycle by the quantum processor after active mitigation by the quantum processor of the spin-bath polarization the control system causes performance of the second quantum annealing cycle by the quantum processor after a cessation of the active mitigation of the spin-bath polarization.

20. The hybrid computing system of claim 17 wherein to read out the first state of the qubit the control system causes:
raising a tunneling barrier of the qubit to be raised; and
a shift of the first state of the qubit to a quantum flux parametron (QFP).

21. The hybrid computing system of claim 20 wherein to shift the first state of the qubit to a QFP the control system causes the spin orientation of the QFP to be the same as the spin orientation of the qubit, and to induce a second state in the at least one qubit further causes:
a buffer QFP to behave as an antiferromagnetic (AFM) coupler, the buffer QFP providing AFM coupling between the qubit and the QFP.

22. The hybrid computing system of claim 21 wherein to causes a buffer QFP to behave as an antiferromagnetic (AFM) coupler the control system causes a compound Josephson junction (CJJ) bias of a buffer QFP to be set to zero.

23. The hybrid computing system of claim 15 wherein to cause active mitigation of a spin-bath polarization the control system causes an at least partial depolarization of the spin-bath polarization by the quantum processor.

24. The hybrid computing system of claim 15 wherein to induce a second state in the at least one qubit the control system causes the first state of the at least one qubit of the quantum processor to flip to a second state opposite the first state.

25. The hybrid computing system of claim 24 wherein to cause the first state of the qubit of the quantum processor to flip to a second state opposite the first state the control system:
causes the first state of the qubit to be read out; and
causes the state of the qubit to be the opposite state of the first state.

26. The hybrid computing system of claim 16 wherein to cause performance of an annealing cycle by the quantum processor to generate a first state of a qubit of the quantum processor the control system causes a performance of an annealing cycle by the quantum processor to generate a first spin orientation of a qubit of the quantum processor.

27. The hybrid computing system of claim 26 wherein to inducing a second state in the at least one qubit, the control system causes the first state of the qubit of the quantum processor to flip to a second spin orientation, the second spin orientation opposite to the first spin orientation.

28. The method of claim 1, wherein the hybrid computer comprises a digital processor and the method comprises:
programming a problem onto the digital processor; and
wherein reading out a first state of the at least one qubit comprises reading out at least a portion of a sample solution to the problem.

29. A method of operation of a hybrid computing system comprising a quantum processor, the quantum processor comprising a plurality of superconducting qubits, the method comprising:
performing a first quantum annealing cycle by the quantum processor to generate a first state of a qubit of the plurality of superconducting qubits;
reading out the first state of the qubit by:
raising a tunneling barrier of the qubit; and
shifting the first state of the qubit to a quantum flux parametron (QFP) to cause the spin orientation of the QFP to be the same as the spin orientation of the qubit; and
actively mitigating by the quantum processor a spin-bath polarization.

30. The method of claim 29, wherein actively mitigating by the quantum processor a spin-bath polarization comprises:
causing a buffer QFP to behave as an antiferromagnetic (AFM) coupler, the buffer QFP providing AFM coupling between the qubit and the QFP;
raising the tunneling barrier of the qubit; and
lowering the tunneling barrier of the qubit after a determined duration.

* * * * *